No. 762,771. PATENTED JUNE 14, 1904.
W. SWENSON.
MACHINE FOR PULLING COTTON STALKS.
APPLICATION FILED FEB. 6, 1904.
NO MODEL. 2 SHEETS—SHEET 2.
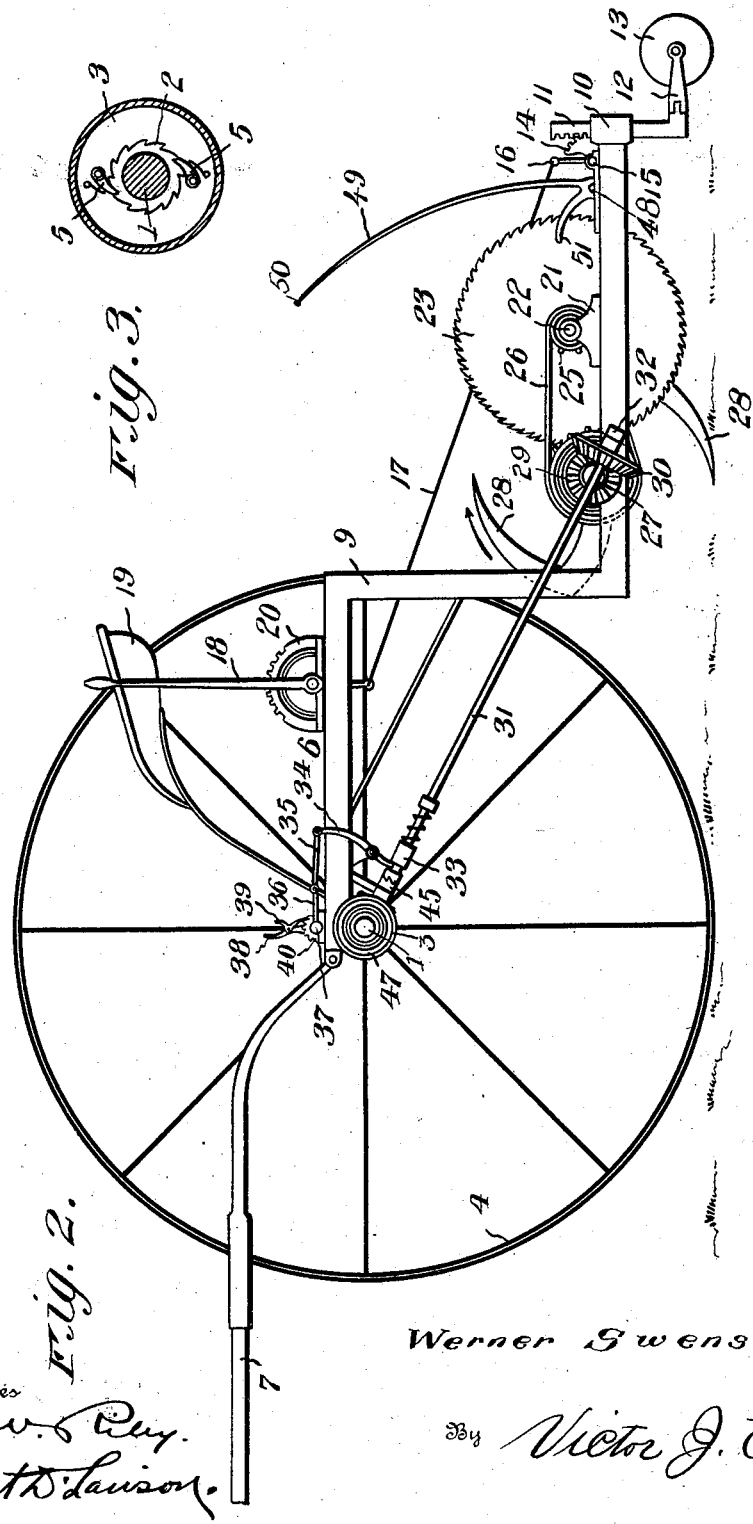
Inventor
Werner Swenson.
Witnesses
By Victor J. Evans
Attorney No. 762,771. Patented June 14, 1904.

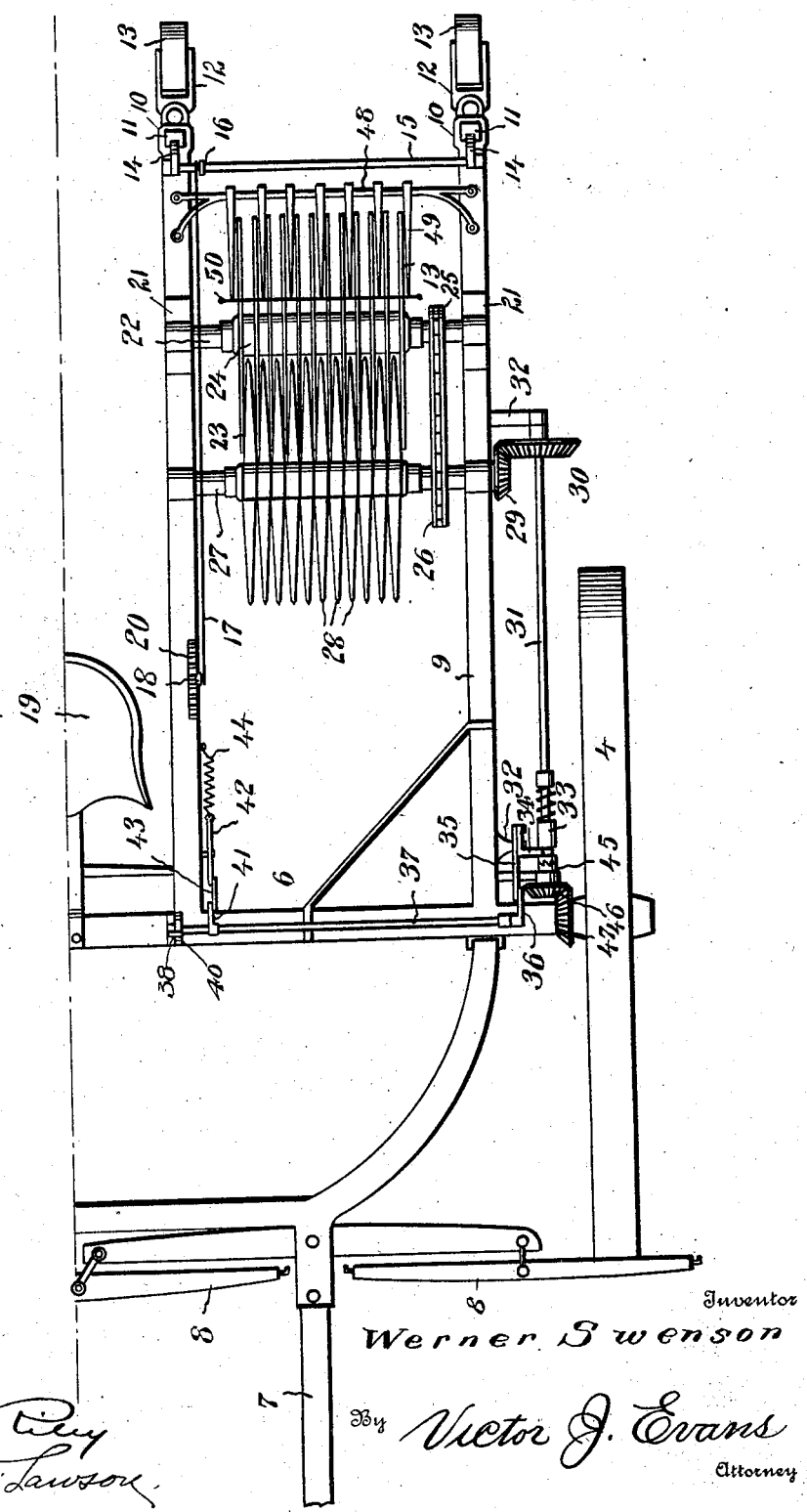

UNITED STATES PATENT OFFICE.

WERNER SWENSON, OF AUSTIN, TEXAS.

MACHINE FOR PULLING COTTON-STALKS.

SPECIFICATION forming part of Letters Patent No. 762,771, dated June 14, 1904.

Application filed February 6, 1904. Serial No. 192,354. (No model.)

*To all whom it may concern:*

Be it known that I, WERNER SWENSON, a citizen of the United States, residing at Austin, in the county of Travis and State of Texas, have invented new and useful Improvements in Machines for Pulling Cotton-Stalks, of which the following is a specification.

My invention relates to new and useful improvements in machines for pulling and cutting cotton-stalks; and its object is to provide a machine of this character adapted to be drawn over the rows of picked cotton-plants and to pull the same from the ground and feed them to revoluble saws arranged upon the machine.

A further object is to provide means for holding the stalks in position upon the saws until they are cut into minute pieces.

Another object is to provide mechanism for throwing the working parts of the machine into or out of operation, said mechanism being located adjacent to the driver's seat.

With the above and other objects in view the invention consists of a frame supported by driving-wheels, and arranged on this frame are parallel shafts, one of which contains a series of oppositely-extending pulling-hooks which are adapted to swing between rotary saw-disks mounted upon the other shaft. Retaining-prongs are arranged in rear of the saw-disks for the purpose of holding the stalks in position against the saws until the same are thoroughly cut thereby.

The invention also consists of mechanism for transmitting rotary motion from the drive-wheels to the two shafts and for adjusting the frame vertically.

The invention also consists of means for throwing the driving mechanism into or out of operative relation with the shaft.

The invention also consists in the further novel construction and combination of parts hereinafter more fully described and claimed, and illustrated in the accompanying drawings, showing the preferred form of my invention, and in which—

Figure 1 is a plan view of one half of a machine constructed in accordance with my invention, said half being similar but arranged oppositely to the second half of the machine. (Not shown.) Fig. 2 is a side elevation of the machine, and Fig. 3 is an enlarged transverse section through the hub of one of the driving-wheels.

Referring to the figures by numerals of reference, 1 is a revoluble axle, at each end of which is secured a ratchet-wheel 2, inclosed by the hub 3 of a driving-wheel 4, and secured within this hub are spring-pressed pawls 5, which normally bear upon the ratchet-wheel. It will therefore be seen that when the wheels 4 are rotating during the forward movement of the machine the axle will be revolved therewith, but either of the wheels can be partly or entirely stopped or can be rotated backward without causing a corresponding movement of the axle. This arrangement is especially desirable where it is necessary to turn the machine, thereby causing one of the wheels to rotate faster than the other. A frame 6 is supported by the axle at the front end thereof and has tongues 7 extending therefrom and any suitable arrangement of whiffletrees 8, whereby suitable draft-animals can be readily connected to the machine. The frame is preferably formed of parallel angular side rails 9, forming two similar sections, one of which has been shown in Fig. 1. The rear ends of the side rails of this section are provided with sleeves 10, in which are slidably mounted racks 11, and to the lower ends of these racks are pivoted rearwardly-extending arms 12, having wheels 13 journaled therein. The racks 11 are engaged by toothed segments 14, secured to the ends of a shaft 15, which is journaled upon the side rails 9 and has an upwardly-extending arm 16 thereon, to which is connected a rod 17. This rod extends upward and is connected to the lower end of a lever 18, fulcrumed adjacent to the driver's seat 19 and adapted to be locked in any suitable position by means of a toothed segment 20, adapted to engage locking means upon the lever. (Not shown.) Journaled within detachable bearings 21, arranged upon the lower portions of the side rails 9, is a transversely-extending shaft 22, upon which are secured circular saw-disks 23, which are adapted to rotate with the shaft. These disks are spaced apart by washers 24 in any suitable manner, and a sprocket 25 is secured to the shaft and engages a chain 26, which serves to transmit rotary motion to said shaft from a second shaft 27, extending transversely of and journaled upon the side rails 9. This second shaft has a series of oppositely-extending hooks 28 secured thereon and revoluble therewith, all of the hooks being arranged in alinement and being so positioned as to contact with the surface of the ground as they rotate. The outer faces of the hooks are in an arc substantially concentric with the shaft 27, and these hooks work between the saw-disks 23. A beveled gear 29 is secured to the shaft 27 and meshes with a gear 30, secured to a shaft 31, journaled in brackets 32, extending laterally from the outer side rail. This shaft has a spring-pressed clutch member 33 feathered upon it and engaged by a lever 34, said lever being connected, by means of a rod 35, with an arm 36, extending from one end of a shaft 37, journaled upon the front portion of the frame 6. A foot-lever 38 is secured to the shaft 37 adjacent to the seat 19 and has a pawl 39 thereon which normally engages a toothed segment 40, secured to the frame 6. An arm 41 extends from the shaft 37 and is connected to one end of a lever 42 by means of a rod 43, and the other end of this lever is secured to a spring 44, fastened to one of the side rails 9. The clutch 33 is adapted to engage a second clutch member 45, to which is secured a beveled gear 46, meshing at all times with a beveled gear 47, secured to the axle 1.

A suitably-braced rod 48 is secured to the side rails 9 adjacent to their rear ends, and extending upward therefrom are similar prongs 49, the upper ends of which are connected by a cross-rod 50. These prongs are so placed that two saw-disks are located between every two prongs. Short tongues 51 extend inwardly from the lower ends of the prongs and between the pairs of saw-disks, thereby forming, with the prongs, forks for the reception of the stalks.

When the machine is drawn forward, the shafts 27 and 22 will not be rotated unless the lever 38 is pressed forward so as to swing the clutch member 33 into engagement with the clutch member 45, thereby tensioning the spring 44. Motion will therefore be transmitted from the wheels 4 and axle 1 to the shaft 31 and through gears 30 and 29 and the chain 26 to the two shafts 27 and 22. The hooks 28 will be caused to rotate in the direction of the arrow in Fig. 2, and the saw-disks 23 will be revolved in the same direction. The hooks upon swinging downward into contact with the surface of the ground will grasp the stalks therebetween and throw them upward upon the saw-disks, and these disks will cut them and throw them against prongs 49. The stalks will fall by gravity upon the tongues 51, and will thus be held in position against the saw-disks until they are thoroughly cut, when they will be discharged upon the ground. The height of the frame can be regulated by means of the lever 18. By drawing backward on this lever the segment 14 will raise the racks 11, and this movement can be reversed by reversing the operation of the lever.

It will be understood that both sides of the machine are constructed in the same manner and either or both can be operated at one time.

If desired, the bearings 21 can be removed and the saws dispensed with.

It will be seen that the machine is very simple in construction and will effectually remove the stalks and destroy them.

In the foregoing description I have shown the preferred form of my invention; but I do not limit myself thereto, as I am aware that modifications may be made therein without departing from the spirit or sacrificing any of the advantages thereof, and I therefore reserve the right to make such changes as fairly fall within the scope of my invention.

Having thus described the invention, what is claimed as new is—

1. In a machine of the character described, the combination with driving-wheels, an axle, and a frame supported upon the axle; of parallel revoluble shafts extending transversely of the frame, means for transmitting rotary motion thereto from the driving-wheels, saw-disks secured upon one of the shafts and revoluble therewith, oppositely-arranged pulling-hooks secured to and revoluble with the other shaft and movable between the saw-disks, and retaining-prongs extending above and out of alinement with the pulling-hooks.

2. In a machine of the character described, the combination with driving-wheels, an axle, and a frame supported thereby; of connected retaining-prongs upon the frame, tongues extending therefrom, a revoluble shaft upon the frame, saw-disks revoluble therewith and overlapping the tongues, a second shaft upon the frame, pulling-hooks extending therefrom and movable between the disks, and means for transmitting rotary motion to the shafts from the driving-wheels.

3. In a machine of the character described, the combination with driving-wheels, an axle, and a frame supported thereby; of connected retaining-prongs upon the frame, tongues extending therefrom, shafts journaled upon the frame, saw-disks secured to one of the shafts and overlapping the tongues, oppositely-arranged series of pulling-hooks secured to the other shaft and movable between the saw-disks, and means for transmitting rotary motion from the driving-wheels to the shaft.

4. In a machine of the character described, the combination with driving-wheels, an axle, and a frame supported thereby; of connected retaining-prongs upon the frame, tongues extending therefrom, shafts upon the frame, saw-disks secured to one of the shafts and overlapping one of the tongues, oppositely-arranged series of alining pulling-hooks upon the other shaft and movable between the saw-disks, mechanism for transmitting rotary motion to the shafts from the driving-wheels, and means for shifting said mechanism into or out of operative relation with the driving-wheels.

5. In a machine of the character described, the combination with driving-wheels, an axle, and a frame supported thereby; of connected retaining-prongs upon the frame, tongues extending therefrom, parallel shafts upon the frame, saw-disks on one of the shafts and overlapping one of the tongues, oppositely-arranged series of alining pulling-hooks extending from the other shaft and movable between the disks, mechanism for transmitting rotary motion from the driving-wheels to the shaft, means for shifting said mechanism into or out of operative relation with the driving-wheels, and a frame-adjusting device.

In testimony whereof I affix my signature in presence of two witnesses.

WERNER SWENSON.

Witnesses:
WALTER BREMOND,
PIERRE BREMOND.